United States Patent [19]

Schwab et al.

[11] 4,307,222

[45] Dec. 22, 1981

[54] PROCESS FOR PREPARING POLYARYLENE POLYETHERS AND A NOVEL POLYARYLENE POLYETHER

[75] Inventors: Thomas H. Schwab, North Brunswick; Wong F. Ark, Bridgewater; Robert A. Clendinning, New Providence, all of N.J.

[73] Assignee: Union Carbide Corporation, New York, N.Y.

[21] Appl. No.: 162,952

[22] Filed: Jun. 25, 1980

[51] Int. Cl.$^3$ .............................................. C08G 65/40
[52] U.S. Cl. .................................. 528/174; 528/125; 528/126; 528/219
[58] Field of Search ................ 528/219, 125, 126, 174

[56] References Cited

U.S. PATENT DOCUMENTS

| 4,105,635 | 8/1978 | Freeman | 528/126 |
| 4,108,837 | 8/1978 | Johnson et al. | 528/126 |
| 4,175,175 | 11/1979 | Johnson et al. | 528/125 |

Primary Examiner—Earl A. Nielsen
Attorney, Agent, or Firm—Donald M. Papuga

[57] ABSTRACT

Described herein is an improved process for preparing polyarylene polyethers by (a) converting a dihydric phenol to the alkali metal phenolate by adding an alkali metal or alkali metal compound to the phenol in a mixture of a sulfone or sulfoxide solvent and a solvent which forms an azeotrope with water, (b) removing water by codistillation with the azeotrope forming cosolvent, and (c) reacting the phenolate mixture with a dihalobenzeneoid compound, wherein a lighter colored product is obtained by adding the sulfone or sulfoxide solvent in increments. This may be accompanied by (1) adding an increment of the sulfone or sulfoxide solvent to a mixture of the dihydric phenol in the codistillation solvent and adding the remaining portion during the azeotroping step, or (2) adding an increment of the sulfone or sulfoxide solvent to the mixture of dihydric phenol and codistillation solvent and the remaining portion to the system simultaneously with the alkali metal hydroxide or other phenolate forming alkali metal source, or (3) adding a first increment of the sulfone or sulfoxide to the dihydric phenol-azeotrope forming solvent prior to step (a), a second increment simultaneously with the addition of alkali metal source in step (a), and the remainder during or at the end of azeotroping step (b).

14 Claims, No Drawings

PROCESS FOR PREPARING POLYARYLENE POLYETHERS AND A NOVEL POLYARYLENE POLYETHER

BACKGROUND OF THE INVENTION

This invention relates to an improved process for preparing polyarylene polyethers. The polyarylene polyethers produced by the precess of this invention are low in color.

Poly(arylene polyether) resins are tough, rigid, high strength thermoplastics which maintain their properties over a wide temperature range of from $-150°$ F. to above $300°$ F. They have a high continuous use temperature of about $300°$ F. They are hydrolytically stable and have excellent mechanical and electrical properties which allows them to be molded into a variety of articles.

There are several methods for preparing polyarylene polyethers. For example, U.S. Pat. Nos. 4,108,837 and 4,175,175 describe the preparation of polyarylene polyethers, and in particular, polysulfones. Several one-step and two-step processes are described in these patents. In these processes, a double alkali metal salt of a dihydric phenol is reacted with a dihalobenzenoid compound in the presence of sulfone or sulfoxide solvents under substantially anhydrous conditions.

In a two-step process, a dihydric phenol is first converted, in situ, in the presence of a sulfone or sulfoxide solvent to the alkali metal salt by reaction with an alkali metal or alkali metal compound. After removing water, a dihalobenzenoid compound is reacted with the double salt. Further, the alkali metal salt of the dihydric phenol may be added in the solvent to the dihalobenzenoid compound either continuously, incrementally or all at once to achieve the polymerization reaction. Several other variations of the process are described in the patents.

However, the polyarylene polyether polymers produced by said processes tend to have a high color which precludes their use in several applications.

It has been found that the sulfone or sulfoxide solvent can undergo side reactions with the dihydric phenol and the alkali metal or alkali metal hydride, hydroxide, alkoxide or alkyl compounds which imparts color to the polymer. Additionally, the sulfone and sulfoxide solvent can decompose under reaction conditions to produce colored products. For example, under the reaction conditions of producing polyarylene polyethers, the dimethyl sulfoxide solvent can decompose to formaldehyde, dimethyl sulfide, dimethyl disulfide and other products, all of which impart color to the polymer.

However, the sulfone and sulfoxide solvents are particularly effective in preparing polyarylene polyethers since they are good solvents for the alkali metal salts of the dihydric phenols. Therefore, a need exists to eliminate or substantially reduce the side reactions and decomposition of these solvents. Such elimination or reduction would produce polyarylene polyether polymers which are low in color.

DESCRIPTION OF THE INVENTION

It has now been found that polyarylene polyether polymers having low color can be produced in the presence of a sulfone or sulfoxide solvent by the incremental addition of such solvent. The total amount of sulfone or sulfoxide solvent required for the formation of the alkali metal double salt of the dihydric phenol is not added initially as in the processes described in U.S. Pat. Nos. 4,108,837 and 4,175,175, but rather it is added incrementally during the formation of the double salt as well as after its formation. Such incremental addition of the sulfone or sulfoxide solvent minimizes colorforming side reactions between the solvent, dihydric phenol and the alkali metal compounds. Also, decomposition of the sulfone or sulfoxide solvents is minimized.

Specifically, the present process is an improved process for preparing polyarylene polyethers which comprises the steps of:

(a) reacting a dihydric phenol with about a stoichiometric amount of an alkali metal, or an alkali metal hydride, hydroxide, alkoxide or alkyl compound in the presence of a solvent comprising a sulfone or sulfoxide, or mixtures thereof, to form the alkali metal double salt of the dihydric phenol, (b) removing water from the mixture by codistillation using an azeotrope forming solvent, and (c) admixing about an equimolar amount of a dinuclear dihalobenzenoid compound and effecting reaction of the dihalobenzenoid compound and the alkali metal double salt of the dihydric phenol in the sulfone or sulfoxide solvent at temperatures above about $100°$ C. and below the decomposition temperature of the reactants, the solvent and the polymer formed, wherein the improvement comprises:

(I) adding an increment of the sulfone or sulfoxide solvent to a mixture of dihydric phenol and solvent, and then adding the remainder of the sulfone or sulfoxide solvent during step (b), or (II) adding an increment of the sulfone or sulfoxide solvent to a mixture of dihydric phenol and solvent and then adding the remainder of the sulfone or sulfoxide solvent to the mixture simultaneously with the alkali metal or alkali metal hydride, hydroxide, alkoxide or alkyl compound, or (III) adding an increment of the sulfone or sulfoxide solvent to a mixture of the dihydric phenol and solvent, adding another increment of the sulfone or sulfoxide solvent to the mixture simultaneously with the alkali metal or alkali metal hydride, hydroxide, alkoxide, or alkyl compound, and then adding the remainder of the sulfone or sulfoxide solvent during step (b), or at the end of step (b).

The polyarylene polyether resins which may be prepared by the improved process of this invention are linear, thermoplastic polyarylene polyethers wherein the arylene units are interspersed with ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage i.e., $-SO_2-$ or $-CO-$, between arylene groupings, to provide sulfone or ketone units in the polymer chain in addition to arylene units and ether units. The polymer has a basic structure comprising recurring units of the formula:

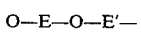

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyether resins described in U.S. Pat. No. 3,264,536, the disclosure of which is hereby incorporated herein by reference, for the purpose of describing and exemplifying E and E' in more detail. It is preferred that the dihydric phenol be a weakly acidic dinuclear phenol such as, for example, the dihydroxy diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. While these halogenated bisphenolic alkanes are more acidic than the nonhalogenated bisphenols and hence slower in reacting in this process, they do impart valuable flame resistance to these polymers. Other materials also termed appropriately "bisphenols" are also haighly valuable and preferred. These materials are the bisphenols of a symmetrical or unsymmetrical joining group, as, for example, ether oxygen (—O—),

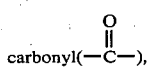
carbonyl(—C—), sulfide (—S—),

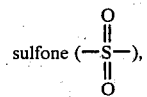
sulfone (—S—), or hydrocarbon residue in which the two phenolic nuclei are joined to the same or different carbon atoms of the residue.

Such dinuclear phenols can be characterized as having the structure:

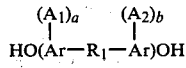
HO(Ar—R₁—Ar)OH wherein Ar is an aromatic group and preferably is a phenylene group, A₁ and A₂ can be the same or different inert substituent groups as alkyl groups having from 1 to 4 carbon atoms, halogen atoms, i.e. fluorine, chlorine, bromine or iodine, or alkoxy radicals having from 1 to 4 carbon atoms, a and b are integers having a value from 0 to 4, inclusive, and R₁ is representative of a bond between aromatic carbon atoms as in dihydroxy-diphenyl, or is a divalent radical, including for example, radicals such as

—C—,

—O—, —S—, —SO—, —S—S—, —SO₂—, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols include among others: the bis-(hydroxyphenyl) alkanes such as 2,2-bis-(4-hydroxyphenyl)propane, 2,4'-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)-propane, 2,2-bis-(4-hydroxyphenyl)pentane, 3,3-bis-(4-hydroxyphenyl)pentane 2,2-bis-(4-hydroxyphenyl)heptane, bis-(4-hydroxyphenyl)phenylmethane, 2,2-bis-(4-hydroxyphenyl)-1-phenylpropane, 2,2-bis-(4-hydroxyphenyl)1,1,1,3,3,3,-hexafluoropropane and the like;

di(hydroxyphenyl)sulfones such as bis-(4-hydroxyphenyl sulfone), 2,4'-dihydroxydiphenyl sulfone, 5-chloro-2,4'-dihydroxydiphenyl sulfone, 5'-chloro-4,4'-dihydroxydiphenyl sulfone, and the like.

di(hydroxyphenyl)ethers such as bis-(4-hydroxyphenyl)ether, the 4,3'-, 4,2'- 2,2'- 2,3'- dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl) ether, bis-(4-hydroxy-3-chlorophenyl) ether,bis-(4-hydroxy-3-fluorophenyl) ether, bis-(4-hydroxy-3-bromophenyl) ether, bis-(4-hydroxynaphthyl) ether, bis-(4-hydroxy-3-chloronaphthyl) ether, 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro-group. The dihalobenzenoid or dinitrobenzenoid compound can be either mononuclear where the halogens or nitro-groups are attached to the same benzenoid ring or polynuclear where they are attached to different benzenoid rings, as long as there is an activating electron withdrawing group in the ortho or para position of that benzenoid nucleus. Fluroine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5for best results.

Any electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'- difluorodiphenyl sulfone, although such other strong withdrawing groups hereinafter mentined can also be used with equal ease.

The more powerful of the electron withdrawing groups give the fastest reactions and thence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzenoid nucleus are either hydrogen (zero electron withdrawing), or other groups having a positive sigma value, as set forth in J. F. Bunnett in Chem. Rev. 49 273 (1951) Quart. Rev., 12, 1 (1958). See also Taft, *Steric Effects in Organic Chemistry*, John Wiley & Sons (1956), chapter 13; *Chem. Rev.*, 53, 222; *JACS*, 74, 3120; and *JACS*, 75, 4231.

The activating group can be basically either of two types:

(a) monovalent groups that activate one or more halogens or nitro-groups on the same ring such as another nitro or halo group, phenylsulfone, or alkylsulfone cyano, trifluoromethyl, nitroso, and hetero nitrogen as in pyridine.

(b) divalent group which can activate displacement of halogens on two different rings, such as

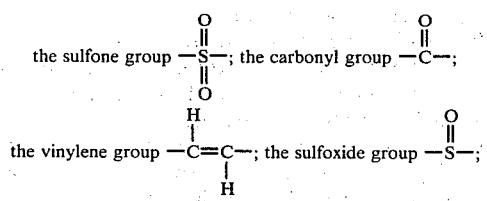

the azo-group —N=N—; the saturated fluorocarbon groups —CF$_2$CF$_2$—;

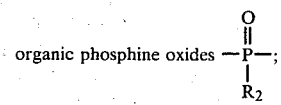

where R$_2$ is a hydrocarbon group, and

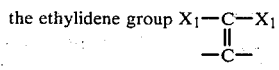

where X$_1$ can be hydrogen or halogen and activating groups within the nucleus which can activate halogens as nitro functions on the same ring such as in the case with difluorobenzoquinone, 1,4- or 1,5- or 1,8-difluoroanthraquinone, etc.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

A preferred form of the polyarylene polyethers of this invention are those prepared using the dihydric polynuclear phenols of the following four types, including the derivatives thereof which are substituted with inert substituent groups

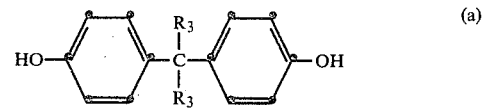

in which the R$_3$ group represents independently hydrogen, lower alkyl, aryl and the halogen substituted groups thereof, which can be the same or different, preferably each R$_3$ is methyl;

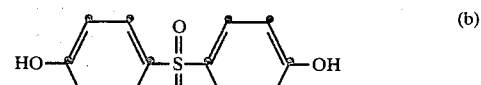

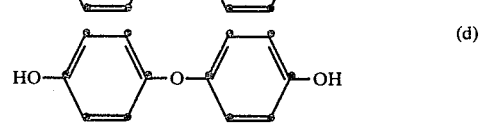

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residua.

The polyarylne polyethers have a reduced viscosity of from about 0.4 to about 1.5 as measured in an appropriate solvent at an appropriate temperature depending on the particular polyarylene polyether, such as in methylene chloride at 25° C.

The virgin polyarylene polyethers prepared by the improved process of this invention have a color factor less than about 20 as measured on filtered resin reactor solutions.

The preferred poly(aryl ether)s have repeating units of the formula:

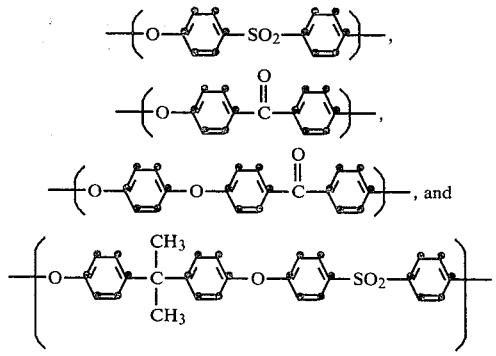

The polyarylene polyether polymers are prepared by the procedures as set forth in U.S. Pat. Nos. 4,108,837 and 4,175,175, i.e., by the substantially equimolar reaction of a double alkali metal salt of a dihydric phenol with a dihalobenzenoid compound in the presence of liquid organic sulfone or sulfoxide solvents and cosolvents under substantially anhydrous conditions. Catalysts are not necessary for this reaction. The polymers may be prepared in a two-step process in which a dihydric phenol is first converted in situ in the sulfone or sulfoxide solvent to the alkali metal salt by the reaction with the alkali metal or the alkali metal hydride, hydroxide, alkoxide or alkyl compounds. Preferably, the alkali metal hydroxide is employed and after removing the water which is present or formed, in order to secure substantially anhydrous conditions, admixing and reacting about stoichiometric quantities of the dihalobenzenoid compound. The polyarylene polyethers are also prepared by simultaneously contacting substantially equimolar amounts of an alkali metal double salt of a dihydric phenol and a dihalobenzenoid compound with a solvent mixture comprising an azeotrope former or co-solvent and a sulfone or sulfoxide reaction solvent in a weight ratio of from about 10/1 to about 1/1, preferably from about 4/1 to about 3/1, removing water from the reaction mass by co-distillation with the azeotrope forming solvent until substantially anhydrous conditions are attained, adjusting the ratio of azeotrope formed to reaction solvent from about 1/1 to about 1/10, preferably from about $\frac{1}{3}$ to about $\frac{1}{4}$, by removing excess azeotrope former, and reacting the alkali metal double salt with the dihalobenzenoid compound in the liquid phase of the sulfone or sulfoxide reaction solvent.

The polyarylene polyethers may also be prepared by a two-step process wherein substantially equimolar amounts of a dihydric phenol, rather than the alkali metal double salt thereof, and a dihalobenzenoid compound are simultaneously contacted with the solvent mixture as described above. The dihydric phenol is then converted in situ to the alkali metal double salt by reacting with about stoichiometric amounts of the alkali metal, the alkali metal hydride, hydroxide, alkoxide or the alkali metal alkyl compounds. Thereafter water is removed, the solvent ratio adjusted and the monomers reacted as described above.

The sulfone or sulfoxide solvents which are suitable for use herein are selected from one or more of the following formula:

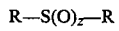

in which each R represents a monovalent lower hydrocarbon group free of aliphatic unsaturation on the alpha carbon atom, and preferably contains less than about 8 carbon atoms or when connected together represents a divalent alkylene group with z being an integer from 1 to 2 inclusive. Thus, in all of these solvents the oxygen atoms and two carbon atoms are bonded directly to the sulfur atom. The solvents may be depicted as those having the following formula

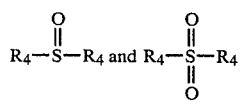

wherein the R$_4$ groups are lower alkyl, such as methyl, ethyl, propyl, butyl and like groups and aryl groups such as phenyl and alkyl phenyl groups as well as those where the R$_4$ groups are interconnected as in a divalent alkylene bridge such as the following:

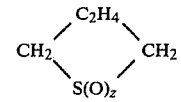

These solvents include dimethyl sulfoxide, dimethyl sulfone, diethyl sulfoxide, diethyl sulfone, diisopropyl sulfone, tetrahydrothiophene 1,1-dioxide (commonly called tetramethylene sulfone or sulfolane) and tetrahydrothiophene-1 monoxide. Aliphatic unsaturation on the α carbon atom, such as occurs in divinyl sulfone and sulfoxide, should not be present, as such materials tend to be reactive and polymerize under the conditions of this reaction. However, unsaturation on a β carbon atom or one further removed from the sulfur atom can be tolerated and such solvents can be employed in this reaction.

It is essential in the polymerization reaction that the solvent be maintained substantially anhydrous before and during the reaction. While amounts of water up to about one percent can be tolerated, and are somewhat beneficial when employed with fluorinated dihalobenzenoid compounds, amounts of water substantially greater than this are desirably avoided as the reaction of water with the dihalobenzenoid compound leads to formation of phenolic species and only low molecular weight products are secured.

In situations where it is desired to prepare the alkali metal salt of the dihydric phenol in situ in the reaction solvent, the dihydric phenol and an alkali metal or alkali metal halide, hydroxide, alkoxide or alkali compounds are admixed in essentially stoichiometric amounts and normal precautions taken to remove all the water of neutralization preferably by distillation of a water-containing azeotrope from the solvent-metal salt mixture.

It has been found convenient to employ benzene, xylene, halogenated benzenes or other inert organic azeotrope-forming organic liquids in performing this. Heating the alkali metal hydroxide, dihydric phenol and small amounts of the azeotrope former to reflux for several hours while removing the azeotrope is the most desirable. However, it is obvious that any other technique for removing essentially all of the water can be equally satisfactory.

It is not essential and critical in this reaction that all of the azeotropic former be removed before the reaction of the alkali metal salt of the bisphenol with the dihalobenzenoid compound. In fact, it is desirable in some instances to employ an amount of such material in excess of that needed to azeotrope off all of the water, with the balance being used as a co-solvent or inert diluent with the sulfone or sulfoxide principal solvent. Thus, for instance, benzene, heptane, xylene, toluene, chlorobenzene, dichlorobenzene and like inert liquids can be beneficially employed.

The azeotrope former can be one either miscible or immiscible with the sulfone or sulfoxide solvent. If it is not miscible it should be one which will not cause precipitation of the polymer in the reaction mass. Heptane is such a solvent. When employed, it will merely remain inert and immiscible in the reaction mass. If the azeotrope former would cause precipitation of the polymer, it should be removed almost completely from the reaction mass before initiating polymerization.

For such reasons, it is preferred to employ azeotrope formers which are miscible with the major solvents and which also act as co-solvents for the polymer during polymerization. Chlorobenzene, dichlorobenzene and xylene are azeotrope formers of this class. Preferably the azeotrope former should be one boiling below the decomposition temperature of the major solvent and be perfectly stable and inert in the process, particularly inert to the alkali metal hydroxide when the alkali metal salt of the dihydric phenol is prepared in situ in the presence of the inert diluent or azeotrope former.

Chlorobenzene and o-dichlorobenzene serve particularly well as the inert diluent and are able to significantly reduce the amount of the sulfone or sulfoxide solvent necessary. The co-solvent mixture using even as much as 50 percent of the halogenated benzene with dimethyl sulfoxide, for example, not only permits the formed polymer to remain in solution and thus produce high molecular weight polymers, but also provides a very economical processing system, and an effecting dehydration operation.

Any of the alkali metals, or alkali metal hydrides, hydroxides, alkoxides or alkyl compounds can be employed in this technique. Alkali metal hydroxides are preferred. Potassium and cesium salts have been found to react considerably faster than the sodium salts, but due to expense of the cesium salts, the sodium or potassium salts are preferred. As heretofore indicated, the alkali metal salt should, of course, be the double metal salt, i.e. both aromatic hydroxyl groups being saponified, in order to prepare these products. Single metal salts ordinarily limit the molecular weight of the product. While this may be desirable as a chain terminator or molecular weight regulator near the end of the reaction period, the initial reaction and the major portion thereof should be with the double alkali metal salt of the dihydric phenol. The alkali metal moieties of this compound however can be the same or different alkali metals.

In the improved process of this invention all of the sulfone or sulfoxide solvent is not added initially and together with the reactants as in the processes of the prior art. In one embodiment of this invention, an increment of the sulfone or sulfoxide solvent is added to a mixture of dihydric phenol and solvent. The increment corresponds to a sulfone or sulfoxide solvent to dihydric phenol ratio of from about 0.4 to 1 to about 0.5 to 1. The alkali metal, or alkali metal hydride, hydroxide, alkoxide or alkyl compound is then added, and reacted with the dihydric phenol to form its alkali metal double salt. The mixture is heated and co-distilled with solvent. During the early stages of co-distillation, the remainder of the sulfone or sulfoxide solvent is added to the reaction mixture. A dihalobenzenoid compound is added and the polymerization takes place as described above.

In another embodiment of this invention, an increment of the sulfone or sulfoxide solvent is added to a mixture of dihydric phenol and solvent. The amount of the increment added is as described above. The remainder of the sulfone or sulfoxide solvent is then added simultaneously with the alkali metal or alkali metal hydride, hydroxide, alkoxide or alkyl compound which reacts with the dihydric phenol to form its alkali metal double salt. The mixture is heated and codistilled with solvent. A dihalobenzenoid compound is added and the polymerization takes place as described above.

In a further embodiment of this invention, an increment of the sulfone or sulfoxide solvent is added to a mixture of dihydric phenol and solvent. The amount of the increment added is as described above. Another increment of the sulfone or sulfoxide solvent is then added simultaneously with the alkali metal or alkali metal hydride, hydroxide, alkoxide or alkyl compound which reacts with the dihydric phenol to form its alkali metal double salt. The increment corresponds to a sulfone or sulfoxide solvent to dihydric phenol ratio of from about 1.25 to 1 to about 1.75 to 1. The mixture is then heated and co-distilled with solvent. During the early stages or at the end of co-distillation, the remainder of the sulfone or sulfoxide solvent is added. A dihalobenzenoid compound is added and the polymerization takes place as described above.

In the improved process, it is preferable that the presence of oxygen be kept minimal during the formation and dehydration of the alkali metal salt of the dihydric phenol. Therefore, a nitrogen purge of the initial reactor charge is helpful in minimizing the presence of oxygen. Also, sparging nitrogen into the reaction vessel during the simultaneous addition of the sulfone or sulfoxide solvent and the alkali metal or alkali metal hydride, hydroxide, alkoxide or alkyl compound facilitates oxygen removal from the reactor.

The alkali metal or alkali metal hydride, hydroxide, alkoxide or alkyl compounds are preferably added to the dihydric phenol at a reactor temperature of from about 40° to about 60° C. The alkali compounds are added such that the stoichiometry of alkali compounds to dihydric phenol is from about 99.2 percent to about 99.7 percent. Stoichiometry below about 99.2 pecent and above about 99.7 percent tends to promote color generation.

The sulfone or sulfoxide solvent also promotes color generation in the polyarylene polyethers so that its concentration during the reaction to form the alkali metal salt of the dihydric phenol and subsequent reaction of said alkali metal salt with dihalobenzenoid compound should be minimized to produce low colored polyarylene polyethers. Thus, the ratio of co-solvent to sulfone or sulfoxide solvent should be relatively high, i.e., preferably from about 2 to 1 to about 2.7 to 1. Additionally, the ratio of sulfone or sulfoxide solvent to dihydric phenol should be relatively low, i.e., preferably from about 1.5 to 1 to about 2 to 1, to minimize concentration of the sulfone or sulfoxide solvent in the system.

The polymerization reaction, i.e., the reaction between the alkali metal salt of the dihydric phenol and the dihalobenzenoid compound is carried out at temperature above about 100° C. and below the decomposition temperature of the reactants, the solvent(s) and the polymer formed.

For example, in the preparation of polysulfones in dimethyl sulfoxide this temperature is in the range of from about 150° to 170° C., preferably from about 155° to 165° C. The reaction is carried out from about ¼ to about 1 hour.

In a further embodiment of this invention, a fractionation column can be used to facilitate dehydration of the polyarylether reaction system, i.e., remove the water formed during the reaction between the alkali metal compounds and the dihydric phenol. A fractionation column facilitates water removal from the azeotrope former/water/sulfone or sulfoxide solvent mixture boiled-up during dehydration, shortens the time required to effect batch dehydration, and minimizes the boil-up and subsequent removal of the sulfone or sulfoxide solvent from the polyarylether reaction mixture, thereby affording a reduction in the total sulfone or sulfoxide solvent reactor charge. The higher sulfone or sulfoxide solvent reactor concentrations which arise through the use of a fractionation column have been found to produce minimal polyarylether color formation when the improved processes of this invention are used together with a reduction in the sulfone or sulfoxide total solvent reactor charge.

EXAMPLES

The following examples serve to give specific illustrations of the practice of this invention but they are not intended in any way to limit the scope of this invention.

CONTROL A

This example illustrates the preparation of polysulfone without the incremental addition of dimethyl sulfoxide solvent.

A four-neck, 500 ml, round bottom distilling flask was equipped with a mechanical stirrer, two three-way parallel side-arm adapters, a thermometer, two dropping funnels, a dry nitrogen stainless steel inlet tube, a Liebig condenser, and a distillation receiver.

Into the flask was charged 205.44 g (1.825 moles) of monochlorobenzene, 102.72 g (1.315 moles) of dimethyl sulfoxide, and 51.36 g (0.225 moles) of bisphenol-A; 120 g of monochlorobenzene was charged to the distillation receiver. The mixture was purged with dry nitrogen for 30 minutes at about 25° C. and then heated to 40° C. A continuous nitrogen sweep was maintained on the flask during the heating period and throughout the remainder of the reaction. From an additional funnel, 17.92 g (0.45 moles) of sodium hydroxide was charged to the flask as a 50% solution in distilled water. Bisphenol-A and sodium hydroxide react to form the disodium salt of bisphenol-A and two moles of water.

The water of reaction, plus that entering with the sodium hydroxide, was removed from the reaction mixture by co-distillation with monochlorobenzene. Reflux began at 115° C. Water, monochlorobenzene, and dimethyl sulfoxide were boiled-up together, condensed, and separated in the distillation receiver. Monochlorobenzene was recycled from the bottom of the receiver to the vapor space in the flask. Material temperature increased to 140° C. in about one hour after the onset of reflux. At about 130° C., a sodium bisphenate-dimethyl sulfoxide complex (⅔ mole ratio) precipitated from solution.

Distillation was continued, without monochlorobenzene recycle, to bring the material temperature from 140° C. to 155° C. This ensured solubilization of the bisphenate-dimethyl sulfoxide complex and complete water removal from the reaction system. The total distillate collected was approximately 272 ml of monochlorobenzene plus 30 ml of water and dimethyl sulfoxide. From a dropping funnel, 92% of a 50% solution of 4,4'-dichlorodiphenylsulfone (64.62 g) in monochlorobenzene (64.62 g) was charged to the flask at a temperature of about 120° C. over a 10 minute period. 4,4'-dichlorodiphenylsulfone reacts exothermally with the sodium bisphenate to form polysulfone oligomers and sodium chloride by-product salt.

Monochlorobenzene distillation (46 ml) was then continued to raise the material temperature to about 160° C. Prepolymerization was complete after 30 minutes at about 160° C., at which time the remaining 8% of the 4,4'-dichlorodiphenylsulfone/monochlorobenzene solution was charged to the flask. Polymerization was then conducted at about 160° C. until the desired molecular weight was achieved (15 to 30 minutes).

The reaction was then quenched to about 135° C. with 166 g of anhydrous monochlorobenzene, terminated by sparging methyl chloride through the viscous polymer solution for about 30 minutes, and then reterminated with 0.17 g of 50% of sodium hydroxide to ensure conversion of bisphenol-A hydroxyl end-groups to phenates. Methyl chloride addition was then continued for about 30 minutes, the batch cooled to about 90° C., acidified with 0.50 g of oxalic acid to a pH of 4, and further diluted with monochlorobenzene to a volume of about 500 ml. At about 25° C. the polymer solution was filtered through a medium porosity sintered-glass funnel to remove sodium chloride.

Approximately 50 ml of the clear filtrate was removed. Percent polymer was determined from a 1.0000 g sample heated for 10 minutes on an O'Haus Moisture Determination Scale. The 50 ml sample was then adjusted to 10% solids by addition of monochlorobenzene and pressure filtered through a fine porosity sintered glass funnel. The batch color factor (24) was determined by comparing the sample's % transmittance (94.6) to monochlorobenzene in a Fisher Electrophotometer II using a blue (425 mm) filter. Percent transmittance was converted to absorbance (0.0238) using the Beer-Lambert equation, i.e., $$\text{Absorbance} = \log\left(\frac{100}{\% \text{ transmittance}}\right)$$

and the color factor defined by the following equation:

$$\text{color factor} = 1000 \text{ (absorbance)}$$

Polymer recovery from the salt-free reaction mixture was obtained by methanol coagulation (5/1 methanol/polymer solution ratio) in a Waring blender. The coagulant was then washed in the blender with additional methanol (350 ml) to ensure removal of dimethyl sulfoxide and monochlorobenzene, filtered, and then dried at about 120° C. and 30 mm Hg vacuum. A polysulfone polymer was obtained having a reduced viscosity of 0.50 as measured in chloroform at 25° C.

EXAMPLE 1

This Example demonstrates the incremental addition of dimethyl sulfoxide as per procedure (I) of this invention.

The equipment used to carry out the experiment was that described in Control A.

Into the 500 ml round bottom flask was charged 205.44 g (1.825 moles) of monochlorobenzene, 25.68 g (0.329 moles) of dimethyl sulfoxide (dimethyl sulfoxide/bisphenol-A charge ratio=0.51/1), and 51.36 g (0.225 moles) of bisphenol-A; 120 g of monochlorobenzene was charged to the distillation receiver. The mixture was purged with dry nitrogen for 30 minutes at about 25° C. and then heated to 40° C. A continuous nitrogen sweep was maintained on the flask during the heating period and throughout the remainder of the reaction. From an addition funnel, 17.92 g (0.45 moles) of sodium hydroxide was then charged to the flask as a 50% solution in distilled water.

The batch was then heated to reflux (110° C.) and dehydrated by co-distillation with monochlorobenzene. During the early stages of dehydration (110° C. to 125° C.) the remainder of the dimethyl sulfoxide (77.04g or 0.986 moles) was slowly charged to the reaction flask.

The overall monochlorobenzene/dimethyl sulfoxide/-bisphenol-A reactor charge ratios were 4/2/1.

During dehydration, monochlorobenzene was recycled from the bottom of the receiver to the vapor space of the flask. Material temperature increased to 140° C. in about one hour after the onset of reflux. At about 130° C., a sodium bisphenate-dimethyl sulfoxide complex precipitated from solution.

Distillation was continued, without monochlorobenzene recycle, to bring the material temperature from 140° C. to 155° C. This ensured solubilization of the bisphenate-dimethyl sulfoxide complex and complete water removal from the reaction system. The total distillate collected was approximately 272 ml of monochlorobenzene plus 30 ml of water and dimethyl sulfoxide. From a dropping funnel, 92% of a 50% solution of 4,4'-dichlorodiphenylsulfone (64.62g) in monochlorobenzene (64.62g) was charged to the flask at a temperature of about 120° C. over a 10 minute period, after which monochlorobenzene distillation (46 ml) was continued to raise the material temperature to about 160° C. Prepolymerization was complete after 30 minutes at about 160° C., at which time the remaining 8% of the 4,4'-dichlorodiphenylsulfone/monochlorobenzene solution was charged to the flask. Polymerization was then conducted at about 160° C. until the desired molecular weight was achieved (15 to 30 minutes).

The reaction was then quenched to about 135° C. with 166g of anhydrous monochlorobenzene, terminated by sparging methyl chloride through the viscous polymer solution for 30 minutes, and then reterminated with 0.17g of 50% of sodium hydroxide to ensure conversion of bisphenol-A hydroxyl end-groups to phenates. Methyl chloride addition was then continued for about 30 minutes, the batch cooled to about 90° C., acidified with 0.50g of oxalic acid to a pH of 4, and further diluted with monochlorobenzene to a volume of about 500 ml. At about 25° C. the polymer solution was filtered through a medium porosity sintered-glass funnel to remove sodium chloride.

The color factor was determined by the procedure as described in Control A and found to be 21.

Polymer recovery from the salt-free reaction mixture was obtained by methanol coagulation as described in Control A.

A polysulfone polymer was obtained having a reduced viscosity of 0.50 as measured in chloroform at 25° C.

EXAMPLE 2

This Example demonstrates the incremental addition of dimethyl sulfoxide as per procedure (II) of this invention.

The equipment used to carry out the experiment was that described in Control A.

Into the 500 ml round bottom flask was charged 205.44g (1.825 moles) of monochlorobenzene and 51.36g (0.225 moles) of bisphenol-A; 120g of monochlorobenzene was charged to the distillation receiver. The mixture was purged with dry nitrogen for 15 minutes at about 25° C. and then heated to 40° C. with deaeration. From an additional funnel, 19.52g (0.250 moles) of dimethyl sulfoxide (dimethyl sulfoxide/bisphenol-A charge ratio=0.38/1) was charged to the flask and the mixture purged with nitrogen for an additional 15 minutes. The remainder of the dimethyl sulfoxide (83.20g or 1.065 moles) and 35.84g (0.45 moles) of 50% sodium hydroxide were then simultaneously charged to the flask from dropping funnels over a period of about 30 minutes with deaeration and slow heat-up to reflux (110° C.). a continuous nitrogen sweep was maintained on the flask throughout the remainder of the reaction cycle.

The overall monochlorobenzene/dimethyl sulfoxide/bisphenol-A reactor charge ratios were 4/2/1. The water of reaction, plus that entering with the sodium hydroxide was removed from the reaction mixture by codistillation with monochlorobenzene. Water, monochlorobenzene, and dimethyl sulfoxide were boiled-up together, condensed, and separated in the distillation receiver. Monochlorobenzene was recycled from the bottom of the receiver to the vapor space of the flask. Material temperature increased to about 140° C. in about one hour after the onset of reflux. At about 130° C., a sodium bisphenate dimethyl sulfoxide complex precipitated from solution.

Distillation was continued, without monochlorobenzene recycle, to bring the material temperature from 140° C. to 155° C. This ensured solubilization of the bisphenate-dimethyl sulfoxide complex and complete water removal from the reaction system. The total distillate collected was approximately 272 ml of monochlorobenzene plus 30 ml of water and dimethyl sulfoxide. From a dropping funnel, 92% of a 50% solution of 4,4'-dichlorodiphenylsulfone (64.62g) in monochlorobenzene (64.62) was charged to the flask at a temperature of about 120° C. over a 10 minute period, after which monochlorobenzene distillation (46 ml) was continued to raise the material temperature to about 160° C. Prepolymerization was complete after about 30 minutes at about 160° C., at which time the remaining 8% of the 4,4'-dichlorodiphenylsulfone / monochlorobenzene solution was charged to the flask. Polymerization was then conducted at about 160° C. until the desired molecular weight was achieved (15 to 30 minutes).

The reaction was then quenched to about 135° C. with 166g of anhydrous monochlorobenzene, terminated by sparging methyl chloride through the viscous polymer solution for 30 minutes, and then reterminated with 0.17g of 50% of sodium hydroxide to ensure conversion of bisphenol-A hydroxyl end-groups to phenates. Methyl chloride addition was then continued for about 30 minutes, the batched cooled to about 90° C., acidified with 0.50g of oxalic acid to a pH of 4, and further diluted with monochlorobenzene to a volume of about 500 ml. At about 25° C., the polymer solution was filtered through a medium porosity sintered-glass funnel to remove sodium chloride.

The color factor was determined by the procedure described in Control A and found to be 14.

Polymer recovery from the salt-free reaction mixture was obtained by methanol coagulation as described in Control A.

A polysulfone polymer was obtained having a reduced viscosity of 0.50 as measured in chloroform at 25° C.

EXAMPLE 3

This Example demonstrates the incremental addition of dimethyl sulfoxide as per procedure (III) of this invention.

The equipment used to carry out the experiment was that described in Control A.

Into the 500 ml round bottom flask was charged 205.44g (1.825 moles) of monochlorobenzene and 51.36g (0.225 moles) of bisphenol-A; 120g of monochlorobenze was charged to the distillation receiver. The mixture was purged with dry nitrogen for 15 minutes at about 25° C. and then heated to 40° C. with deaeration. From an addition funnel, 19.52g (0.250 moles) of dimethyl sulfoxide (dimethyl sulfoxide/bisphenol-A charge ratio=0.38/1) was charged to the flask and the mixture purged with nitrogen for an additional 15 minutes. To the reaction flask 44.68g (0.572 moles) of dimethyl sulfoxide (total dimethyl sulfoxide/bisphenol-A charge ratio=1.25/1) and 35.84g (0.45 moles) of 50% sodium hydroxide were then simultaneously charged from dropping funnels over a period of about 30 minutes with deaeration and slow heat-up reflux (110° C.). A continuous nitrogen sweep was maintained on the flask throughout the remainder of the reaction cycle.

The batch was dehydrated by co-distillation with monochlorobenzene. Material temperature increased to 140° C. in about one hour after the onset of reflux. At 140° C. the remainder of the dimethyl sulfoxide (25.68g or 0.329 moles) was changed to the flask to achieve a final dimethyl sulfoxide/bisphenol-A charge ratio of 1.75/1.

Distillation was continued, without monochlorobenzene recycle, to bring the material temperature from 140° C. to 155° C. The total distillate collected was approximately 282 ml of monochlorobenzene plus 30 ml of water and dimethyl sulfoxide. From a dropping funnel, 92% of a 50% solution of 4,4'-dichlorodiphenylsulfone (64.62g) in monochlorobenzene (64.62g) was then charged to the flask at a temperature of about 120° C. over a 10 minute period, after which monochlorbenzene distillation (46 ml) was continued to raise the material temperature to about 160° C. Prepolymerization was complete after about 30 minutes at about 160° C., at which time the remaining 8% of the 4,4'-dichlorodiphenylsulfone/monochlorobenzene solution was charged to the flask. Polymerization was then conducted at about 160° C. until the desired molecular weight was achieved (15 to 30 minutes).

The reaction was then quenched to about 135° C. with 166g of anhydrous monochlorobenzene, terminated by sparging methyl chloride through the viscous polymer solution for 30 minutes, and then reterminated with 0.17g of 50% of sodium hydroxide to ensure conversion of bisphenol-A hydroxyl end-groups to phenates. Methyl chloride addition was then continued for about 30 minutes, the batch cooled to about 90° C., acidified with 0.50g of oxalic acid to a pH of 4, and further diluted with monochlorobenzene to a volume of about 500 ml. At about 25° C., the polymer solution was filtered through a medium porosity sintered-glass funnel to remove sodium chloride.

The color factor was determined by the procedure described in Control A and found to be 13.

Polymer recovery from the salt-free reaction mixture was obtained by methanol coagulation as described in Control A.

A polysulfone polymer was obtained having a reduced viscosity of 0.50 as measured in chloroform at 25° C.

CONTROL B

This example illustrates the preparation of polysulfone without the incremental addition of dimethyl sulfoxide solvent, but with a fractionation column to facilitate batch dehydration.

The equipment used to carry out the experiment consisted of that described in Control A along with a glass Vigreux column and micro-gear pump. The Vigreux column was used to facilitate fractionation of monochlorbenzene/water/dimethyl sulfoxide vapors boiled-up from the reaction mixture during batch dehydration. The gear pump was used to recycle monochlorobenzene reflux to the top of the Vigreux column from the bottom of the distillation receiver (or decanter).

Into the 500 ml round bottom flask was charged 205.44g (1.825 moles) of monochlorobenzene, 102.72g (1.315 moles) of dimethyl sulfoxide, and 51.36g (0.225 moles) of bisphenol-A; 160g of monochlorobenzene was charged to the decanter. The mixture was purged with dry nitrogen for 30 minutes at about 25° C. and then heated to 40° C. A continuous nitrogen sweep was maintained on the flask during the heating period and throughout the remainder of the reaction. From an addition funnel, 17.92g (0.45 moles) of sodium hydroxide was charged to the flask as a 50% solution in distilled water. Bisphenol-A and sodium hydroxide react to form the disodium salt of bisphenol-A and two moles of water.

At the onset of distillation (115° C.), monochlorobenzene, water, and dimethyl sulfoxide were boiled-up together, fractionated in the Vigreux column, condensed in the Liebig condenser, and separated in the decanter. When the distillate flow began to raise the preset monochlorobenzene level (160g) in the decanter, the gear pump was started and monochlorobenzene flow to the top of the Vigreux column was controlled to maintain a constant level (or total inventory) in the decanter.

No materials were removed from the reactor-decanter system during batch dehydration. Water boiled-up from the reaction flask accumulated in the top layer of the decanter, displacing an equivalent volume of monochlorobenzene as reflux. Reflux and distillation rates were therefore equal.

Material temperature increased to 140° C. in about one hour after the onset of reflux. Distillation was then continued, without fractionation and monochlorobenzene recycle, to raise the material temperature to about 155° C. The total distillate collected was approximately 312 ml of monochlorobenzene and 30 ml of water and dimethyl sulfoxide. From a dropping funnel, 92% of a 50% solution of 4,4'-dichlorodiphenylsulfone (64.62g) in monochlorobenzene (64.62g) was then charged to the flask at a temperature of about 120° C. over a 10 minute period, after which monochlorobenzene distillation (46ml) was continued to raise the material temperature to about 160° C. Prepolymerization was complete after 30 minutes at 160° C., at which time the remaining 8% of the 4,4'-dichlorodiphenylsulfone/monochlorbenzene solution was charged to the flask. Polymerization was then conducted at about 160° C. until the desired molecular weight was achieved (15 to 30 minutes).

The reaction was then quenched to 135° C. with 166g of anhydrous monochlorobenzene, terminated by sparging methyl chloride through the viscous polymer solution for 30 minutes, and then reterminated with 0.17g of 50% sodium hydroxide to ensure conversion of bisphenol-A hydroxyl end-groups to phenates. Methyl chloride addition was then continued for about 30 minutes, the batch cooled to 90° C., acidified to pH 4 with 0.50g of oxalic acid, and further diluted with monochlorobenzene to a volume of about 500 ml. At about 25° C., the polymer solution was filtered through a medium porosity sintered-glass funnel to remove sodium chloride.

The color factor was determined by the procedure described in Control A and found to be 29.

Polymer recovery from the salt-free reaction mixture was obtained by methanol coagulation (5/1 methanol/polymer solution ratio) in a Waring blender. The coagulant was then washed in the blender with additional methanol (350 ml) to ensure removal of dimethyl sulfoxide and monochlorobenzene, filtered, and then dried at 120° C. and 30 mm Hg vacuum.

A polysulfone polymer was obtained having a reduced viscosity of 0.50 as measured in chloroform at 25° C.

EXAMPLE 4

This Example demonstrates the incremental addition of dimethyl sulfoxide as per procedure (II) together with a fractionation column.

The equipment used to carry out the experiment consisted of that described in Control B.

Into the 500 ml round bottom flask was charged 205.44g (1.825 moles) of monochlorobenzene and 51.36g (0.225 moles) of bisphenol-A; 160g of monochlorobenzene was charged to the distillation receiver. The mixture was purged with dry nitrogen for 15 minutes at about 25° C. and then heated to 40° C. with deaeration. From an addition funnel, 19.52g (0.250 moles) of dimethyl sulfoxide (dimetyl sulfoxide/bisphenol-A charge ratio=0.38/1) was charged to the flask and the mixture purged with nitrogen for an additional 15 minutes. The remainder of the dimethyl sulfoxide (70.36g or 0.901 moles) and 35.84g(0.45 moles) of 50% sodium hydroxide were then simultaneously charged to the flask from dropping funnels over a period of about 30 minutes with deaeration and slow heat-up to reflux (110° C.). A continuous nitrogen sweep was maintained on the flask throughout the remainder of the reaction cycle. The overall monochlorobenzene/dimethyl sulfoxide/bisphenol-A reactor charge ratios were 4/1.75/1.

At the onset of distillation, monochlorobenzene, water, and dimethyl sulfoxide were boiled-up together, fractionated in the Vigreux column, and separated in the decanter. No materials were removed from the reactor-decanter system during batch dehydration. Water boiled-up from the reaction flask accumulated in the top layer of the decanter, displacing an equivalent volume of monochlorobenzene as reflux. Reflux and distillation rates were therefore equal.

Material temperature increased to 140° C. in about one hour after the onset of reflux. Distillation was continued, without fractionation and monochlorobenzene recycle, to raise the material temperature to about 155° C. The total distillate collected was approximately 322 ml of monochlorobenze and 30 ml of water and dimethyl sulfoxide. From a dropping funnel, 92% of a 50% solution of 4,4'-dichlorodiphenylsulfone (64.62g) in monochlorobenzene (64.62g) was charged to the flask at a temperature of about 120° C. over a 10 minute period after which monochlorbenzene distillation (46 ml) was continued to raise the material temperature to about 160° C. Prepolymerization was complete after 30 minutes at about 160° C. at which time the remaining 8% of the 4,4'-dichlorodiphenysulfone/monochlorobenzene solution was charged to the flask. Polymerization was then conducted at about 160° C. until the desired molecular weight was achieved (15 to 30 minutes).

The reaction was then quenched to about 135° C. with 166g of anhydrous monochlorobenzene, terminated by sparging methyl chloride through the viscous polymer solution for 30 minutes, and then reterminated with 0.17g of 50% sodium hydroxide to ensure conversion of bisphenol-A hydroxyl end-groups to phenates. Methyl chloride addition was then continued for about 30 minutes, the batch cooled to about 90° C., acifified to a pH of 4 with 0.50g of oxalic acid and further diluted with monochlorobenzene to a volume of about 500 ml. At about 25° C., the polymer solution was filtered through a medium porosity sintered-glass funnel to remove sodium chloride.

The color factor was determined by the procedure described in Control A and found to be 20.

Polymer recovery from the salt-free reaction mixture was obtained by methanol coagulation as described in Control B.

A polysulfone polymer was obtained having a reduced viscosity of 0.50 as measured in chloroform at 25° C.

What is claimed is:

1. An improved process for preparing polyarylene polyethers which comprises the steps of:
   (a) reacting a dihydric phenol with about a stoichiometric amount of an alkali metal, or an alkali metal hydride, hydroxide, alkoxide or alkyl compound in the presence of a solvent comprising a sulfone or sulfoxide, or mixtures thereof, to form the alkali metal double salt of the dihydric phenol,
   (b) removing water from the mixture by co-distillation using an azeotrope forming solvent, and
   (c) admixing about an equimolar amount of a dinuclear dihalobenzenoid compound and effecting reaction of the dihalobenzenoid compound and the alkali metal double salt of the dihydric phenol in the sulfone or sulfoxide solvent at temperatues above about 100° C. and below the decomposition temperature of the reactants, the solvent(s) and the polymer formed, wherein the improvement comprises:
   (I) adding an increment of the sulfone or sulfoxide solvent to a mixture of dihydric phenol and solvent, and then adding the remainder of the sulfone or sulfoxide solvent during step (b), or
   (II) adding an increment of the sulfone or sulfoxide solvent to a mixture of dihydric phenol and solvent and then adding the remainder of the sulfone or sulfoxide solvent to the mixture simultaneously with the alkali metal or alkali metal hydride, hydroxide, alkoxide or alkyl compound, or
   (III) adding an increment of the sulfone or sulfoxide solvent to a mixture of the dihydric phenol and solvent, adding another increment of the sulfone or sulfoxide solvent to the mixture simultaneously with the alkali metal or alkali metal hydride, hydroxide, alkoxide or alkyl compound, and then adding the remainder of the sulfone or sulfoxide solvent during step (b) or at the end of step (b).

2. A process as defined in claim 1, wherein the increment of the sulfone or sulfoxide solvent which is added to the mixture of the dihydric phenol and solvent corresponds to a sulfone or sulfoxide solvent to dihydric phenol ratio of from 0.4 to 1.

3. A process as defined in claim 2, wherein the ratio is from about 0.5 to 1.

4. A process as defined in claim 1, wherein the increment of the sulfone or sulfoxide solvent which is added simultaneously with the alkali metal or alkali metal hydride, hydroxide, alkoxide or alkyl compound corresponds to a sulfone or sulfoxide solvent to dihydric phenol ratio of from about 1.25 to 1.

5. A process as defined in claim 4, wherein the ratio is from about 1.75 to 1.

6. A process as defined in claim 1, wherein the sulfone or sulfoxide solvent comprises dimethyl sulfoxide.

7. A process as defined in claim 1, wherein the solvent in step (I) or (II) or (III) comprises a halogenated benzene.

8. A process as defined in claim 7, wherein the halogenated benzene is chlorobenzene or o-dichlorobenzene.

9. A process as defined in claim 1, wherein the dihydric phenol is bisphenol-A and the dihalobenzenoid compound is 4,4'-dichlorodiphenylsufone.

10. A process as defined in claim 1, wherein a fractionation column is used to facilitate dehydration in step (I) or (II) or (III).

11. A polyarylene polyether produced by the process of claim 1.

12. A polyarylene polyether as defined in claim 11, wherein the polyarylene polyether is derived from bisphenol-A and 4,4'-dichlorodiphenylsulfone.

13. A polyarylene polyether having a color factor less than about 20.

14. A polyarylene polyether as defined in claim 13, wherein the polyarylene polyether is derived from bisphenol-A and 4,4-dichlorodiphenylsulfone.

* * * * *